(12) United States Patent
Nahum et al.

(10) Patent No.: US 9,080,855 B2
(45) Date of Patent: Jul. 14, 2015

(54) METHOD UTILIZING IMAGE CORRELATION TO DETERMINE POSITION MEASUREMENTS IN A MACHINE VISION SYSTEM

(75) Inventors: Michael Nahum, Kirkland, WA (US);
Mark Lawrence Delaney, Shoreline, WA (US)

(73) Assignee: Mitutoyo Corporation, Kawasaki-Shi, Kanagawa-Ken (JP)

( * ) Notice: Subject to any disclaimer, the term of this patent is extended or adjusted under 35 U.S.C. 154(b) by 742 days.

(21) Appl. No.: 13/244,040

(22) Filed: Sep. 23, 2011

(65) Prior Publication Data

US 2013/0076892 A1    Mar. 28, 2013

(51) Int. Cl.
*H04N 5/232*    (2006.01)
*G01B 11/00*    (2006.01)
*G06T 7/00*    (2006.01)

(52) U.S. Cl.
CPC ............ *G01B 11/002* (2013.01); *G06T 7/0004* (2013.01); *G06T 2207/10016* (2013.01); *G06T 2207/20081* (2013.01); *G06T 2207/20104* (2013.01); *G06T 2207/30164* (2013.01)

(58) Field of Classification Search
CPC .............................. H04N 5/232; G02B 21/367
USPC ........................... 348/135, E07.085; 359/368
See application file for complete search history.

(56) References Cited

U.S. PATENT DOCUMENTS

| | | | |
|---|---|---|---|
| 6,542,180 B1 * | 4/2003 | Wasserman et al. | ........ 348/131 |
| 6,873,422 B2 | 3/2005 | Nahum | |
| 6,990,254 B2 | 1/2006 | Nahum | |
| 6,996,291 B2 | 2/2006 | Nahum | |
| 7,065,258 B2 | 6/2006 | Nahum | |
| 7,085,431 B2 | 8/2006 | Jones | |
| 7,295,324 B2 | 11/2007 | Jones | |
| 7,324,682 B2 | 1/2008 | Wasserman | |
| 7,327,901 B2 | 2/2008 | Karlsson | |
| 7,432,496 B1 | 10/2008 | Nahum | |
| 7,454,053 B2 | 11/2008 | Bryll | |
| 7,636,478 B2 | 12/2009 | Bryll | |

(Continued)

OTHER PUBLICATIONS

"QVPAK 3D CNC Vision Measuring Machine: Operation Guide," Version 2.0, Manual No. 4911GB, Series No. 359, Mitutoyo Corporation & Micro Encoder Inc., Kanagawa, Japan, Sep. 1996, 86 pages.

(Continued)

*Primary Examiner* — Christopher S Kelley
*Assistant Examiner* — Deirdre Beasley
(74) *Attorney, Agent, or Firm* — Christensen O'Connor Johnson Kindness PLLC

(57) ABSTRACT

A method utilizing image correlation to determine position measurements in a machine vision system. In a first operating state, the machine vision system utilizes traditional scale-based techniques to determine position measurements, while in a second operating state, image correlation displacement sensing techniques are utilized to determine position measurements. The image correlation techniques provide for higher accuracy for measuring distances between features that are separated by more than one field of view. The user may toggle between the operating states through a selection on the user interface, and guidance may be provided regarding when the image correlation mode is likely to provide higher accuracy, depending on factors such as the distance to be measured and the characteristics of the surface being measured.

19 Claims, 8 Drawing Sheets

(56) References Cited

U.S. PATENT DOCUMENTS

| | | |
|---|---|---|
| 7,885,480 B2 | 2/2011 | Bryll |
| 2004/0114218 A1* | 6/2004 | Karlsson et al. ............. 359/368 |
| 2006/0204236 A1* | 9/2006 | Sasaki et al. ................. 396/265 |
| 2006/0250517 A1* | 11/2006 | Nilson et al. ................. 348/370 |
| 2006/0250518 A1* | 11/2006 | Nilson et al. ................. 348/370 |
| 2010/0158343 A1 | 6/2010 | Bryll |
| 2011/0103679 A1 | 5/2011 | Campbell |
| 2011/0316998 A1* | 12/2011 | Kishima ......................... 348/79 |
| 2011/0317259 A1* | 12/2011 | Tanabe et al. ................. 359/383 |
| 2012/0262626 A1* | 10/2012 | Ikeda ............................ 348/373 |

OTHER PUBLICATIONS

"QVPACK 3D CNC Vision Measuring Machine: User's Guide," Version 7.1, 2d ed., Manual No. 99MCB225A, Series No. 359, Mitutoyo Corporation & Micro Encoder Inc., Kanagawa, Japan, Sep. 2003, 370 pages.

* cited by examiner

METHOD UTILIZING IMAGE CORRELATION TO DETERMINE POSITION MEASUREMENTS IN A MACHINE VISION SYSTEM

FIELD OF THE INVENTION

The invention relates generally to machine vision inspection systems, and more particularly to methods for determining position measurements in machine vision inspection systems.

BACKGROUND OF THE INVENTION

Precision machine vision inspection systems (or "vision systems" for short) can be utilized to obtain precise dimensional measurements of inspected objects and to inspect various other object characteristics. Such systems may include a computer, a camera and optical system, and a precision stage that is movable in multiple directions to allow workpiece inspection. One exemplary prior art system, that can be characterized as a general-purpose "off-line" precision vision system is the commercially available QUICK VISION® series of PC-based vision systems and QVPAK® software available from Mitutoyo America Corporation (MAC), located in Aurora, Ill. The features and operation of the QUICK VISION® series of vision systems and the QVPAK® software are generally described, for example, in the *QVPAK 3D CNC Vision Measuring Machine User's Guide*, published January 2003, and the *QVPAK 3D CNC Vision Measuring Machine Operation Guide*, published September 1996, each of which is hereby incorporated by reference in their entirety. This type of system is able to use a microscope-type optical system and move the stage so as to provide inspection images of either small or relatively large workpieces at various magnifications.

Machine vision inspection systems generally utilize automated video inspection. U.S. Pat. No. 6,542,180 (the '180 patent) teaches various aspects of such automated video inspection and is incorporated herein by reference in its entirety. As taught in the '180 patent, automated video inspection metrology instruments generally have a programming capability that allows an automatic inspection event sequence to be defined by the user for each particular workpiece configuration. This can be implemented by text-based programming, for example, or through a recording mode which progressively "learns" the inspection event sequence by storing a sequence of machine control instructions corresponding to a sequence of inspection operations performed by a user with the aid of a graphical user interface, or through a combination of both methods. Such a recording mode is often referred to as "learn mode" or "training mode." Once the inspection event sequence is defined in "learn mode," such a sequence can then be used to automatically acquire (and additionally analyze or inspect) images of a workpiece during "run mode."

The machine control instructions including the specific inspection event sequence (i.e., how to acquire each image and how to analyze/inspect each acquired image) are generally stored as a "part program" or "workpiece program" that is specific to the particular workpiece configuration. For example, a part program defines how to acquire each image, such as how to position the camera relative to the workpiece, at what lighting level, at what magnification level, etc. Further, the part program defines how to analyze/inspect an acquired image, for example, by using one or more video tools such as edge/boundary detection video tools.

Video tools (or "tools" for short) and other graphical user interface features may be used manually to accomplish manual inspection and/or machine control operations (in "manual mode"). Their set-up parameters and operation can also be recorded during learn mode, in order to create automatic inspection programs, or "part programs." Video tools may include, for example, edge/boundary detection tools, autofocus tools, shape or pattern matching tools, dimension measuring tools, and the like.

Measurement accuracy and repeatability in the micron or submicron range are routinely obtained along the X and Y axes (that is, axes parallel to the plane of the inspection images used by precision machine vision inspection systems), in particular when the features being measured are within a single field of view. However, the level of accuracy for the measurement of the distance between features that are separated by more than one field of view tends to be lower than that for features within a single field of view. In particular, when features are being measured that are separated by more than one field of view, the overall distance measurement between the features is typically determined by the difference in the stage positions between the respective images that contain the features to be analyzed, plus the difference in the feature positions in the respective images. The stage positions are typically determined by position encoders (e.g., scale-based encoders), for which the potential position errors may be greater than what is desired for certain applications and/or displacements. It would be desirable for a machine vision inspection system to operate with improved accuracy for measuring distances between features that are separated by more than one field of view.

SUMMARY OF THE INVENTION

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A precision machine vision inspection system for producing position measurements is provided. The machine vision inspection system comprises a stage that receives a workpiece, an imaging system that images the workpiece, a scale-based measurement portion that provides position measurements indicative of the stage position relative to the imaging system, a control system, a display and a user interface. In accordance with one aspect of the invention, the machine vision inspection system is configured to provide at least first and second operating states used to provide the position measurements. The first operating state comprises determining the position of an image based on a scale-based position measurement. The second operating state comprises providing the position of at least one second-state image based on enhanced second-state position measurement provided by using image correlation.

In accordance with another aspect of the invention, the second operating state using image correlation comprises referencing a first image captured at a first image position, the first image position characterized by a first position measurement. In many cases, the first position measurement may be a scale-based position measurement (e.g., as determined in the first operating state). In other cases, the first position measurement may be an enhanced second-state position measurement determined during a period of operation of the second operating state. In either case, the stage is moved from the first image position toward a second-state image position and overlapping images are captured between the first position and the second-state image position. The second-state image is then captured at the second-state image position. The enhanced second-state position measurement is then provided based on the first position measurement and a set of image displacements determined based on using image correlation applied to the first image, the overlapping images, and the second-state image.

In accordance with another aspect of the invention, The user interface is displayed on the display at least during a learn mode of operation of the machine vision inspection system, and the user interface comprises a second-state indicator that indicates when the second operating state that provides the enhanced second-state position measurement is active. In some embodiments, the user interface comprises a second-state activation element that may be operated by a user to activate and/or deactivate the second operating state, such that the user may control the machine vision system to operate in the first operating state at a first time during the learn mode of operation and in the second operating state at a second time during the learn mode of operation. In some embodiments, the second-state activation element and the second-state indicator are provided by a single user interface element. In some embodiments, when a second-state activation element is operated by a user to start the second operating state, the control system automatically defines the image position of a current image as the first image position. In various embodiments, the enhanced second-state position measurement provided in the second operating state may be used in conjunction with a dimensional measuring video tool, that allows a user to select a second feature in the second-state image for performing a distance measurement between the selected second feature in the second-state image and a first feature in the first image.

The machine vision inspection system may comprise a motion control element operated by a user to define the stage position relative to the imaging system during the learn mode of operation. In some embodiments, in the second operating state moving from the first image position toward the second-state image position may comprise the user using the motion control element to define the nominal second-state image position; and the control system may automatically determine the spacing between the overlapping images along a motion path between the first image position and the second-state image position. In some embodiments, the user may further use the motion control element to define intermediate positions that define the motion path between the first image position and the second-state image position In some embodiments, the machine vision inspection system comprises an enhanced position measurement limit parameter which is indicative of a maximum recommended displacement limit referenced to the first image, for using the second operating state to provide an enhanced second state position measurement. The user interface may comprise an enhanced position measurement displacement limit status indicator which indicates at least one of (a) a relationship between a current displacement referenced to the first image and the maximum recommended displacement limit, and (b) a warning when a current displacement referenced to the first image is greater than the maximum recommended displacement limit. In some embodiments, the enhanced position measurement displacement limit status indicator and the second-state indicator (e.g., as outlined above) are provided by a single user interface element. In one specific example embodiment, the enhanced position measurement displacement limit may correspond to a defined number times a dimension of a field of view (e.g., 40 times a FOV dimension).

In some embodiments, the machine vision inspection system comprises a plurality of enhanced position measurement limit parameters which correspond to a plurality of respective optical configurations of the machine vision inspection system.

In some embodiments, during the learn mode of operations the second operating state comprises evaluating an image correlation quality metric for image correlations performed to determine the set of image displacements during the second operating state, and the user interface comprises an indicator of poor image correlation that is displayed based on the image correlation quality metric (e.g., a warning is displayed when the image correlation quality metric indicates poor image quality and/or low correlation quality).

In some embodiments, the user interface further comprises an element operated by a user during the learn mode of operation to define a distance measurement between a first feature in the first image and a second feature in the second-state image, wherein the distance measurement comprises determining a difference between the first position measurement and the second-state position measurement plus a difference of the respective feature positions relative to their respective images.

In some embodiments, when the second operating state using image correlation is active, the scale-based measurement portion is also used for indicating approximate scale-based image positions for at least one of (a) the overlapping images and (b) the second state image, such that a pixel offset search range for a correlation algorithm used in the second state is defined based on the approximate scale-based image positions. For example, the approximate scale-based image positions provided by the scale-based measurement portion allow the pixel offset search range for an image correlation algorithm to be safely limited to fewer pixels than would be required if the scale-based measurement portion were not utilized, which speeds up the image correlation calculations.

In accordance with another aspect of the invention, when the second operating state using image correlation is active, an error checking process is performed which comprises comparing the distance indicated by the image correlation to that indicated by the scale-based measurement portion. In one embodiment, if the difference between the distance indicated by the image correlation is different from that indicated by the scale-based measurement portion by an amount that is greater than an expected error range for the scale-based measurement portion with a defined safety margin, then a warning is provided to the user, and/or the condition is logged, and/or the measurement provided by the scale-based measurement portion is indicated as the current measurement.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
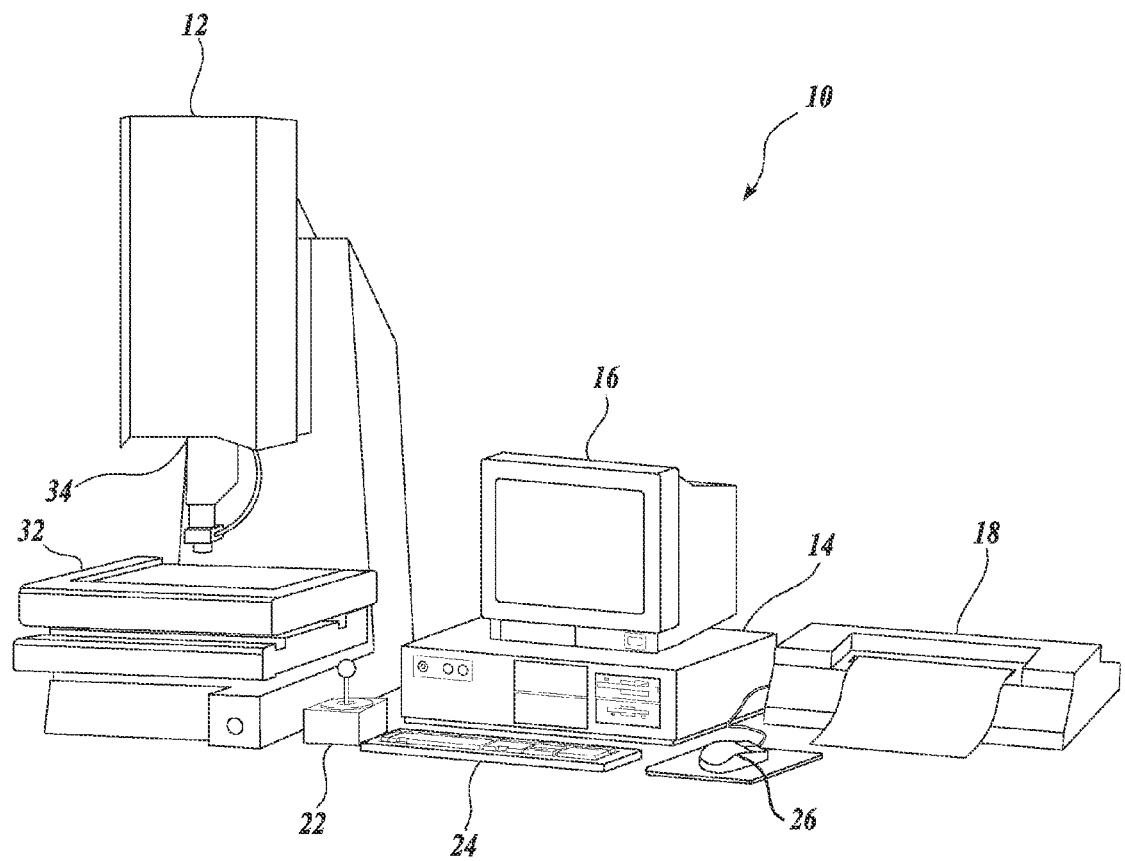
FIG. 1 is a diagram showing various typical components of a general purpose precision machine vision inspection system.

FIG. 1 is a block diagram of one exemplary machine vision inspection system 10 usable in accordance with methods described herein. The machine vision inspection system 10 includes a vision measuring machine 12 that is operably connected to exchange data and control signals with a controlling computer system 14. The controlling computer system 14 is further operably connected to exchange data and control signals with a monitor or display 16, a printer 18, a joystick 22, a keyboard 24, and a mouse 26. The monitor or display 16 may display a user interface suitable for controlling and/or programming the operations of the machine vision inspection system 10.

The vision measuring machine 12 includes a moveable workpiece stage 32 and an optical imaging system 34 which may include a zoom lens or interchangeable lenses. The zoom lens or interchangeable lenses generally provide various magnifications for the images provided by the optical imaging system 34. The machine vision inspection system 10 is generally comparable to the QUICK VISION® series of vision systems and the QVPAK® software discussed above, and similar state-of-the-art commercially available precision machine vision inspection systems. The machine vision inspection system 10 is also described in commonly assigned U.S. Pat. Nos. 7,454,053, and 7,324,682, U.S. patent application Ser. No. 12/343,383, filed Dec. 23, 2008, and Ser. No. 12/608,943, filed Oct. 29, 2009, which are each incorporated herein by reference in their entireties.

Figure 2:
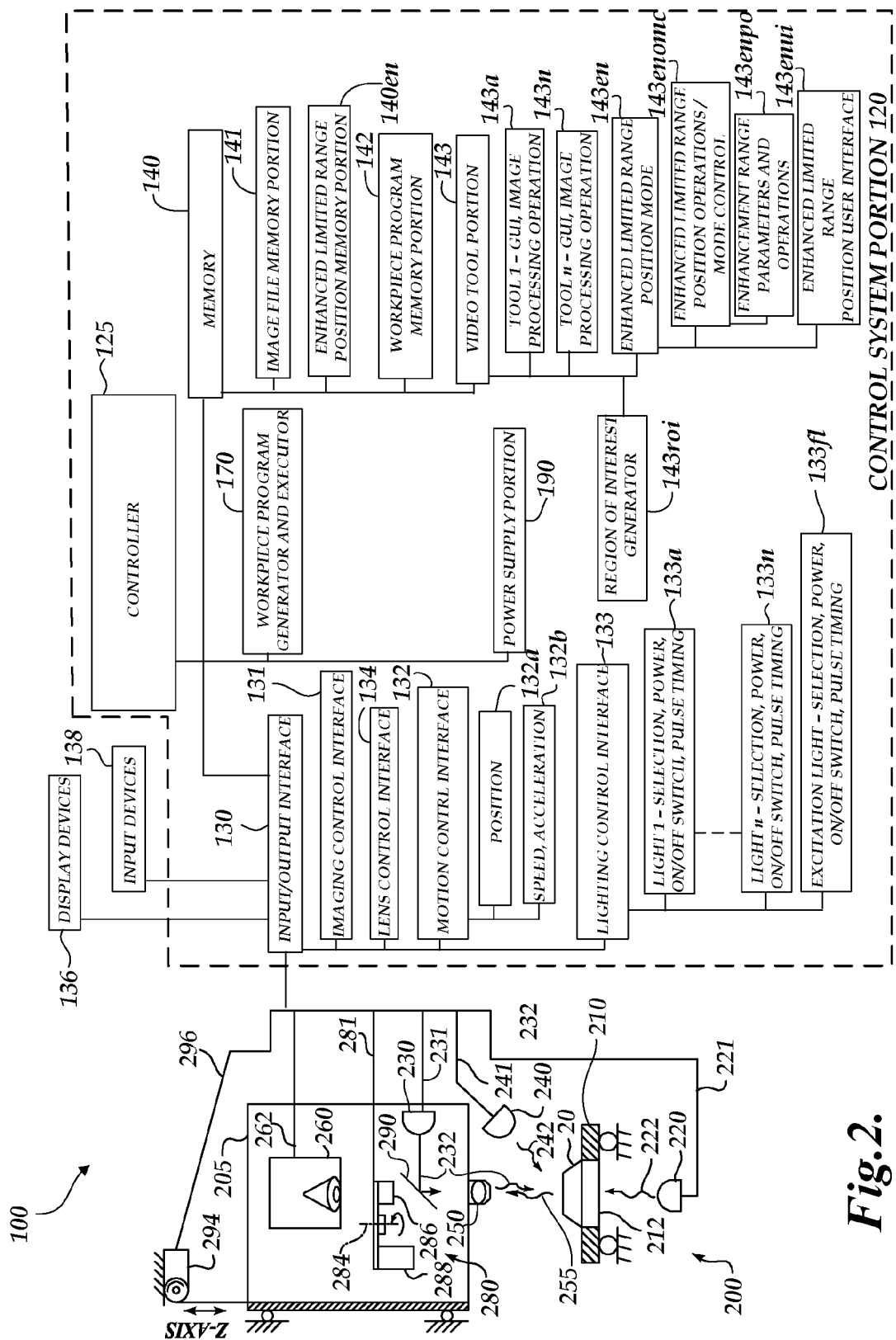
FIG. 2 is a block diagram of a control system portion and a vision components portion of a machine vision inspection system similar to that of FIG. 1, and including features according to this invention.

FIG. 2 is a block diagram of a control system portion 120 and a vision components portion 200 of a machine vision inspection system 100 similar to the machine vision inspection system of FIG. 1, and including features according to this invention. As will be described in more detail below, the control system portion 120 is utilized to control the vision components portion 200. The vision components portion 200 includes an optical assembly portion 205, light sources 220, 230, 230', and 240, and a workpiece stage 210 having a central transparent portion 212. The workpiece stage 210 is controllably movable along X and Y axes that lie in a plane that is generally parallel to the surface of the stage where a workpiece 20 may be positioned. The optical assembly portion 205 includes a camera system 260, an interchangeable objective lens 250, and may include a turret lens assembly 280 having lenses 286 and 288. Alternatively to the turret lens assembly, a fixed or manually interchangeable magnification-altering lens, or a zoom lens configuration, or the like, may be included.

The optical assembly portion 205 is controllably movable along a Z-axis that is generally orthogonal to the X and Y axes, by using a controllable motor 294 that drives an actuator to move the optical assembly portion 205 along the Z-axis to change the focus of the image of the workpiece 20. The controllable motor 294 is connected to the input/output interface 130 via a signal line 296.

A workpiece 20, or a tray or fixture holding a plurality of workpieces 20, which is to be imaged using the machine vision inspection system 100 is placed on the workpiece stage 210. The workpiece stage 210 may be controlled to move relative to the optical assembly portion 205, such that the interchangeable objective lens 250 moves between locations on a workpiece 20, and/or among a plurality of workpieces 20. One or more of a stage light 220, a coaxial light 230, and a surface light 240 (e.g., a ring light) may emit source light 222, 232, and/or 242, respectively, to illuminate the workpiece or workpieces 20. The light source 230 may emit light 232 along a path including a mirror 290. The source light is reflected or transmitted as workpiece light 255, and the workpiece light used for imaging passes through the interchangeable objective lens 250 the turret lens assembly 280 and is gathered by the camera system 260. The image of the workpiece(s) 20, captured by the camera system 260, is output on a signal line 262 to the control system portion 120. The light sources 220, 230, and 240 may be connected to the control system portion 120 through signal lines or busses 221, 231, and 241, respectively. To alter the image magnification, the control system portion 120 may rotate the turret lens assembly 280 along axis 284 to select a turret lens, through a signal line or bus 281.

As shown in FIG. 2, in various exemplary embodiments, the control system portion 120 includes a controller 125, the input/output interface 130, a memory 140, a workpiece program generator and executor 170, and a power supply portion 190. Each of these components, as well as the additional components described below, may be interconnected by one or more data/control buses and/or application programming interfaces, or by direct connections between the various elements.

The input/output interface 130 includes an imaging control interface 131, a motion control interface 132, a lighting control interface 133, and a lens control interface 134. The motion control interface 132 may include a position control element 132a, and a speed/acceleration control element 132b although such elements may be merged and/or indistinguishable. The lighting control interface 133 includes lighting control elements 133a-133n and 133fl which control, for example, the selection, power, on/off switch, and strobe pulse timing, if applicable, for the various corresponding light sources of the machine vision inspection system 100.

The memory 140 may include an image file memory portion 141, an enhanced limited range position memory portion 140en, described in greater detail below, a workpiece program memory portion 142 that may include one or more part programs, or the like, and a video tool portion 143. The video tool portion 143 includes video tool portion 143a and other video tool portions (e.g., 143n), which determine the GUI, image processing operation, etc., for each of the corresponding video tools, and a region of interest (ROI) generator 143roi that supports automatic, semi-automatic and/or manual operations that define various ROIs that are operable in various video tools included in the video tool portion 143.

In the context of this description, and as known by one of ordinary skill in the art, the term video tool generally refers to a relatively complex set of automatic or programmed operations that a machine vision user can implement through a relatively simple user interface (e.g., a graphical user interface, editable parameter windows, menus, and the like), without creating the step-by-step sequence of operations included in the video tool or resorting to a generalized text-based programming language, or the like. For example, a video tool may include a complex pre-programmed set of image processing operations and computations which are applied and customized in a particular instance by adjusting a few variables or parameters that govern the operations and computations. In addition to the underlying operations and computations, the video tool comprises the user interface that allows the user to adjust those parameters for a particular instance of the video tool. For example, many machine vision video tools allow a user to configure a graphical region of interest (ROI) indicator through simple "handle dragging" operations using a mouse, in order to define the location parameters of a subset of an image that is to be analyzed by the image procession operations of a particular instance of a video tool. It should be noted that the visible user interface features are sometimes referred to as the video tool, with the underlying operations being included implicitly.

In common with many video tools, the enhanced limited range position subject matter described herein includes both user interface features and underlying image processing operations, and the like, and the related features may be characterized as features of an enhanced limited range position mode 143en included in the video tool portion 143. The majority of video tools are implemented for a particular instance of analysis in relation to a particular feature or region of interest, perform their function, and then cease operation. In contrast, it will be appreciated that in some embodiments the enhanced limited range position mode features disclosed herein may be applied globally to enhanced limited range position determinations, and may generally persist and continue to operate, until they are explicitly terminated by a user. While a user may experience the features of the enhanced limited range position mode 143en, described below primarily as an operating mode, alternative implementations and/or user interface features may also be provided (e.g., an enhanced limited range distance measuring video tool, etc.). Thus, it should be appreciated that characterizing the enhanced limited range position subject matter of this description as an operating mode in the following description is a matter of choice for description, and it is not intended to be limiting with regard to its appearance to the user, or its manner of implementation. One of ordinary skill in the art will appreciate that the circuits and routines underlying the enhanced limited range position features disclosed herein may implemented as distinct elements, in some embodiments.

Briefly, as will be described in more detail below, in one embodiment the enhanced limited range position mode 143en may be selected by a user to enhance the accuracy of certain short range measurements in a machine vision system 100. In certain implementations, the enhanced limited range position mode 143en may be an alternative to a more typical measurement mode, in which a scale-based measurement portion (e.g., an encoder) is utilized for the position measurements. In contrast, in the enhanced limited range position mode 143en, image correlation techniques may be utilized as part of the measurement process (e.g., to determine a second image position relative to a first image position), in such a way as to increase the accuracy of the measurements, in particular for distances between features that are separated by more than one field of view.

In one embodiment, the enhanced limited range position mode 143en may include a portion that provides enhanced limited range position operations/mode control 143enomc, with a portion for enhancement range parameters and operations 143enpo and a portion that provides an enhanced limited range user interface 143enui. Features and operations associated with these elements are described in greater detail below. Briefly, the enhanced limited range position operations/mode control 143enomc may perform operations (e.g., image analysis operations, memory management, etc.), to configure and support operation of the enhanced limited range position mode 143en as described in greater detail below. In one embodiment, the enhanced limited range position mode 143en may also be linked or otherwise act in conjunction with certain known position measurement operations or tools.

Alternative configurations are possible for the enhanced limited range position mode 143en. In general, it will be appreciated that the enhanced limited range position techniques described herein may be implemented in any now known or later-developed form that is operable in conjunction with the machine vision inspection system 100 to provide the features disclosed herein in relation to the measurement operations.

In general, the memory portion 140 stores data usable to operate the vision system components portion 200 to capture or acquire an image of the workpiece 20 such that the acquired image of the workpiece 20 has desired image characteristics. The enhanced limited range position memory portion 140en may be controlled by the enhanced limited range position operations/mode control 143enomc to store and/or recall the various data used by the enhanced limited range position mode 143en. The memory portion 140 may also contain data defining a graphical user interface operable through the input/output interface 130. The memory portion 140 may also store inspection result data, may further store data usable to operate the machine vision inspection system 100 to perform various inspection and measurement operations on the acquired images (e.g., implemented, in part, as video tools), either manually or automatically, and to output the results through the input/output interface 130.

The signal lines or busses 221, 231, and 241 of the stage light 220, the coaxial lights 230 and 230', and the surface light 240, respectively, are all connected to the input/output interface 130. The signal line 262 from the camera system 260 and the signal line 296 from the controllable motor 294 are connected to the input/output interface 130. In addition to carrying image data, the signal line 262 may carry a signal from the controller 125 that initiates image acquisition.

One or more display devices 136 (e.g., the display 16 of FIG. 1) and one or more input devices 138 (e.g., the joystick 22, keyboard 24, and mouse 26 of FIG. 1) can also be connected to the input/output interface 130. The display devices 136 and input devices 138 can be used to display a user interface, which may include various graphical user interface (GUI) features that are usable to perform inspection operations, and/or to create and/or modify part programs, to view the images captured by the camera system 260, and/or to directly control the vision system components portion 200. The display devices 136 may display user interface features associated with the enhanced limited range position user interface 143enui, described in greater detail below.

In various exemplary embodiments, when a user utilizes the machine vision inspection system 100 to create a part program for the workpiece 20, the user generates part program instructions by operating the machine vision inspection system 100 in a learn mode to provide a desired image acquisition training sequence. For example a training sequence may comprise positioning a particular workpiece feature of a representative workpiece in the field of view (FOV), setting light levels, focusing or autofocusing, acquiring an image, and providing an inspection training sequence applied to the image (e.g., using an instance of one of the video tools on that workpiece feature). The learn mode operates such that the sequence(s) are captured or recorded and converted to corresponding part program instructions. These instructions, when the part program is executed, will cause the machine vision inspection system to reproduce the trained image acquisition and inspection operations to automatically inspect that particular workpiece feature (that is, the corresponding feature in the corresponding location) on a run mode workpiece or workpieces which matches the representative workpiece used when creating the part program.

These analysis and inspection methods that are used to inspect features in a workpiece image are typically embodied in the various video tools (e.g., video tools 143a, 143n, etc.) included in the video tool portion 143 of the memory 140, as outlined above. Many known video tools, or "tools" for short, are included in commercially available machine vision inspection systems, such as the QUICK VISION® series of vision systems and the associated QVPAK® software, discussed above.

As noted above, the enhanced limited range position mode 143en is distinct from the more traditional scale-based measurement mode of a typical machine vision inspection system. In a typical machine vision inspection system, a measurement of the distance between two features that are in different fields of view is traditionally determined by the difference in the stage positions plus the difference in the feature positions in the respective images, wherein the stage (i.e., image) positions are traditionally determined by position encoders (e.g., scale-based encoders). In contrast, in the enhanced limited range position mode 143en, while the feature positions in the respective images may still be determined in the same manner, the difference in the stage (i.e., image) positions is alternatively determined through image correlation techniques, in accordance with the teachings herein. In one embodiment, for the purpose of determining the difference in the stage positions, the machine vision inspection system is essentially operated as a pseudo correlation encoder, although with certain differences from traditional correlation encoders, as will be described in more detail below.

As will be described in more detail below with respect to FIG. 3, various known traditional correlation encoders use images acquired by a sensor array, and correlation between images acquired by the sensor array, to determine deformations and/or displacements of an object. For example, one class of such devices is described in U.S. Pat. No. 6,873,422 (the '422 patent), U.S. Pat. No. 6,990,254 (the '254 patent), U.S. Pat. No. 6,996,291 (the '291 patent), and U.S. Pat. No. 7,065,258 (the '258 patent), all to Nahum, each of which is hereby incorporated by reference in its entirety. In general, in such devices, prior to displacing or deforming the object, a first or reference image arising from the object is captured and stored. Then, after displacing or deforming the object, a second or subsequent image arising from the object is captured and stored. The first and second images are then quantitatively compared, e.g., by correlation operations, on a pixel-by-pixel basis. In general, a plurality of respective comparisons are performed with the first and second images offset, or spatially translated, relative to each other by different respective amounts (e.g., by varying the offset in one pixel increments between the various comparisons). Then the resulting quantitative comparison, such as a correlation function value, is plotted against its corresponding offset amount, or spatial translation position, to determine a correlation function value point. The offsets having the strongest correlations between the second and first images will generate a peak or a trough (depending on how the pixel-by-pixel comparison is performed) in the plot of correlation function value points. The offset amount corresponding to the peak or trough represents the amount of displacement or deformation between the first and second images.

Figure 3:
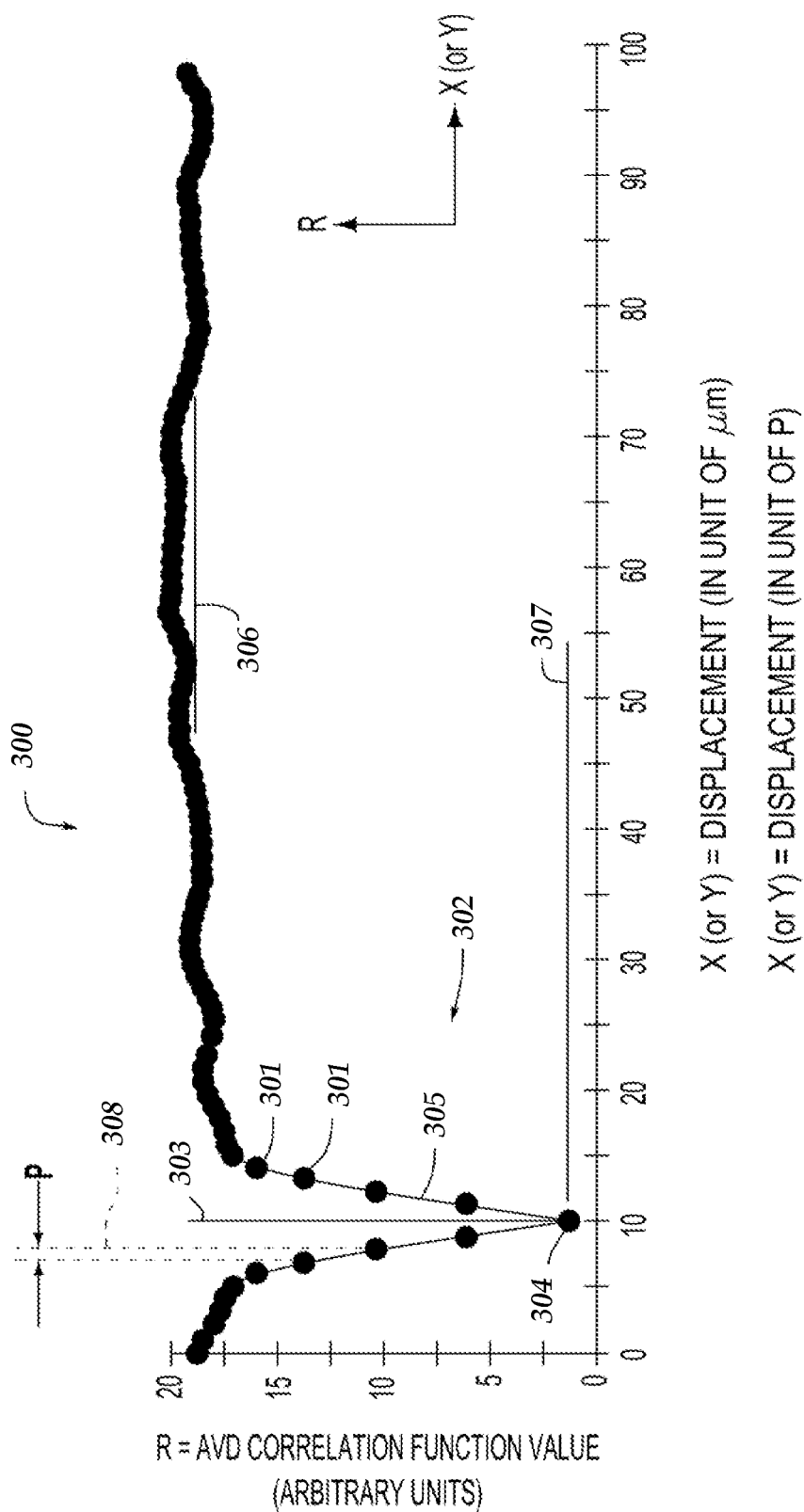
FIG. 3 is a graph illustrating the results of comparing first and second images by an absolute value of difference correlation function when the images are offset at various pixel displacements along a measurement axis.

FIG. 3 is a graph 300 illustrating the results of comparing first and second images including high spatial frequency content (e.g., texture or speckle images) by an absolute value of a difference correlation function when the images are offset at various pixel displacements along one dimension. This difference correlation function is also described in more detail in U.S. Pat. No. 7,295,324, which is hereby incorporated by reference in its entirety. Actual workpiece images may show a lower extremum and/or additional sub-extrema (e.g., additional smaller peaks or valleys) associated with a particular image content. However, for the purposes of understanding the present invention, the basic teachings described below with reference to the relatively ideal correlation graph illustrated in FIG. 3 will be understood to be generally applicable to correlation graphs for a variety of actual workpiece images. As shown in FIG. 3, the extremum of the true continuous correlation function 305 occurs at a "peak offset" or "peak displacement" that is indistinguishable from the extreme correlation function value point 304. However, in general, the extremum does not occur at an offset which is an integer multiple of the pixel spacing, and therefore it does not generally coincide with an extreme correlation function value point. Therefore, the peak offset or displacement is generally found by estimating or "interpolating" the position of the peak of the continuous correlation function between the correlation function value points. The systems and methods disclosed in the previously incorporated '422 patent, or any other suitable method, may be used to estimate the x-coordinate value (and/or y-coordinate value) of the actual peak offset or peak displacement from a selected set of the correlation function value points 301 in the vicinity of the peak region 302. The correlation function value of the most extreme correlation function value point 304, indicated by the line 307, may be used in conjunction with the value of the noise level or average value 306 to normalize the correlation function value point values in the region 302, so that the set of the correlation function value points 301 can be selected according to a normalized value range, in some exemplary embodiments. The x-coordinate value (or y-coordinate value) of the actual, or true, peak offset or peak displacement is indicated by a line 303 extending parallel to the R-axis and coinciding with the point that is the extremum of the true continuous correlation function 305. Assuming that the true continuous correlation function 305 is symmetric in the peak region 302, the line 303 is a symmetry axis and any point on the line 303 is indicative of the x-coordinate value (or y-coordinate value) of the peak offset or peak displacement of the true continuous correlation function 305, which may be found with sub-pixel accuracy, for example according to methods disclosed in the '422 patent.

The '422 patent describes how a sub-pixel error that is spatially periodic at the pixel pitch of the sensor array may arise in the correlation peak location estimates provided by various methods that use curve fitting. The '422 patent teaches various methods for reducing such errors when estimating a correlation peak location. However, some level of periodic sub-pixel error may remain after the methods of the '422 patent are applied. U.S. Pat. No. 7,085,431 to Jones (the '431 patent), which is hereby incorporated herein by reference in its entirety, teaches a method wherein the previously indicated periodic sub-pixel errors, and other errors, are characterized and compensated. U.S. Pat. No. 7,885,480 to Bryll et al. (the '480 patent), which is hereby incorporated herein by reference in its entirety, additionally teaches a method wherein systematic sub-pixel errors, and other errors, are characterized and compensated. It will be appreciated that the sub-pixel accuracy achieved by such techniques may correspond to accuracy and/or resolution on the order of 10 nm or less in various applications.

As will be described in more detail below with respect to FIG. 4, the image correlation techniques of the present invention differ from a traditional correlation encoder, in that rather than determining deformations or displacements of an object, a distance between two different features in two different images is being determined. Furthermore, in one embodiment, through the use of the image correlation techniques in combination with the more traditional scale-based measurements, the search range for the correlation algorithm may be made to only require a few pixels. In other words, because the scale-based portion may provide a relatively accurate indication of how far and in what direction the stage has moved, the pixel offset search range for a correlation algorithm may be defined based on the approximate scale-based image positions, and the search range (XY) for the correlation algorithm may only need to be directed to relatively few pixels in order to determine the relevant correlation peak or valley between the common pixels of a prior image and a current correlation image.

Figure 4:
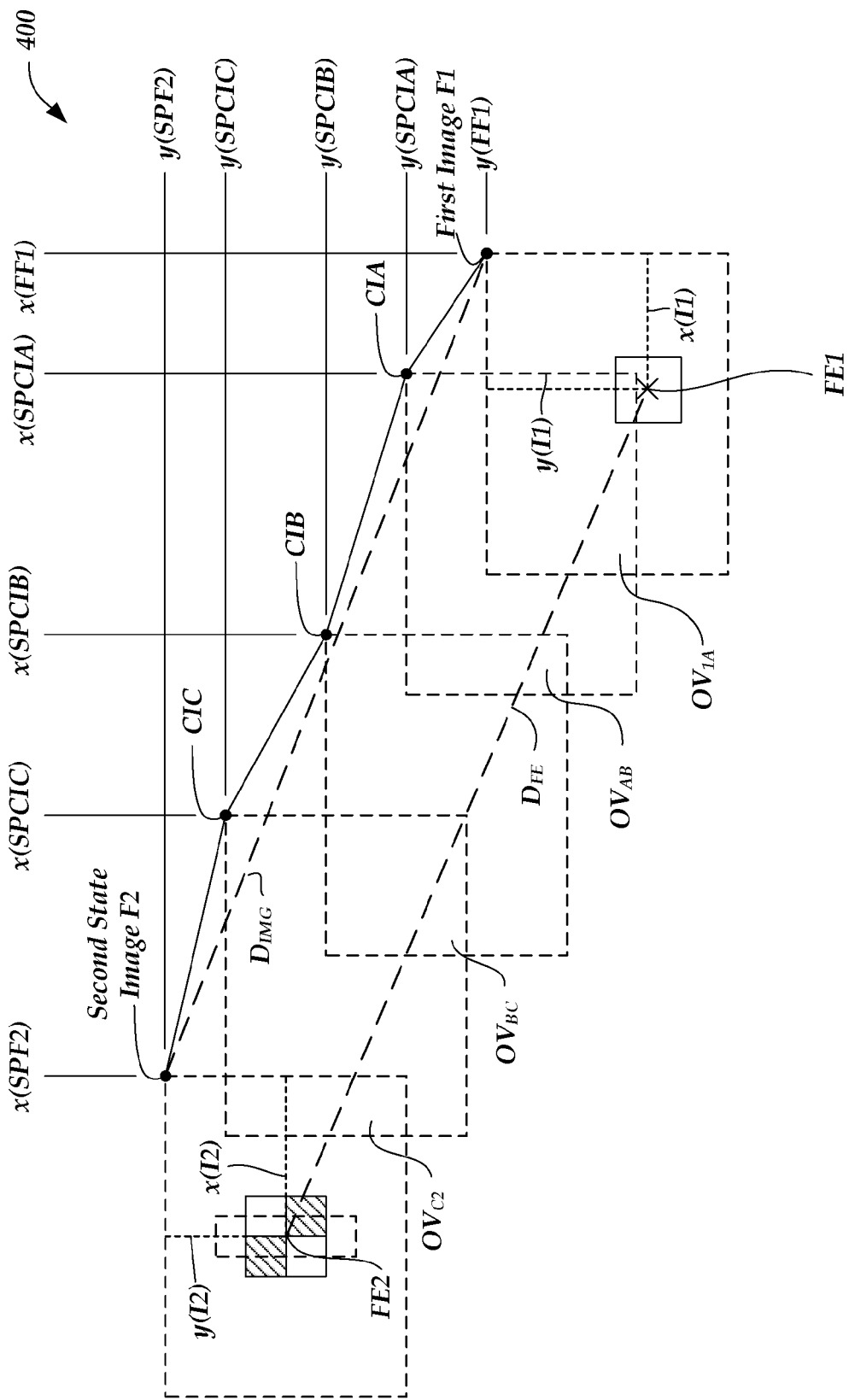
FIG. 4 is a diagram of a portion of a workpiece illustrating how a position of a second image including a second feature may be determined relative to a first image including a first feature by utilizing overlapping images and image correlation.

FIG. 4 is a diagram of a portion of a workpiece 400 illustrating how a position of a second-state image F2 including a second feature FE2 may be determined relative to a first image F1 including a first feature FE1 by using overlapping images and the image correlation techniques of the present invention. As shown in FIG. 4, the first image F1 includes the first feature FE1, while the second-state image F2 includes the second feature FE2. With regard to the feature positions within the respective images, the position of the first feature FE1 is designated by the internal coordinates X(I1) and Y(I1) within the first image F1, and the position of the second feature FE2 is designated by the internal coordinates X(I2) and Y(I2) within the second-state image F2. As will be described in more detail below, in one embodiment, the total distance $D_{FE}$ between the first feature FE1 and the second feature FE2 is determined by the difference in the positions of the first image F1 and the second-state image F2 (i.e., the stage positions) plus the difference in the feature positions within the respective images.

As shown in FIG. 4, a set of overlapping images CIA, CIB, and CIC are captured as the stage is moved from the position of the first image F1 toward the position of the second-state image F2. The location of each of the images F1, CIA, CIB, CIC, and F2 is arbitrarily designated as being referenced by the pixel location in the upper right corner of each of the images. In an alternative embodiment, the movement from the first image F1 to the second-state image F2 may be done in a straight line, rather than as a series of different angled line segments, so as to simplify the image correlation processing and calculations.

Each of the overlapping images CIA, CIB, and CIC is shown to include an overlap portion which is sufficient for the search range processing of the correlation algorithm. More specifically, the first image F1 and the overlapping image CIA are shown to include a common overlap portion $OV_{1A}$, while the overlapping images CIA and CIB have a common overlap portion $OV_{AB}$, and the overlapping images CIB and CIC have a common overlap portion $OV_{BC}$, and the overlapping image CIC and the second-state image F2 have a common overlap portion $OV_{C2}$.

It will be appreciated that in contrast to more traditional image correlation encoder techniques wherein a majority of the pixels in an image may be required for a desired level of accuracy of the image correlation function, in accordance with the techniques described herein, the search range (XY) for the correlation algorithm can be restricted to relatively few pixels from the respective overlap portions. In one embodiment, this is because the scale-based measurement portion of the machine vision inspection system provides a relatively accurate indication of the approximate distance and direction of the movement of the stage, such that only a few pixels are required for the search range of the correlation algorithm to accurately determine the position of the subsequent image. The end result is that the coordinates of the second-state image F2 may be determined with reference to the coordinates of the first image F1 through this image correlation process, from which the distance $D_{IMG}$ between the images F1 and F2 can be determined. As described above, the total distance $D_{FE}$ between the features FE1 and FE2 can then be determined as the distance $D_{IMG}$ plus the difference in the feature positions within their respective images, as indicated by the internal coordinates X(I1), Y(I1), and X(I2), Y(I2), as described above.

It will be appreciated that the enhanced accuracy of the determination of the distance $D_{FE}$ may be useful for various types of applications. As an example, in one specific implementation, the first feature FE1 may correspond to a first edge of an object that is to be measured. The object to be measured may have an approximate width (e.g., 5 microns), with a second edge (not shown) which is not easily accessible (e.g., such as being obscured under a covering substance). However, the second obscured edge may be fabricated so as to be a precise known distance $D_K$ from a remote fiducial, such as the second feature FE2 (which for various reasons may be located more than one field of view away from the object). Since the object has relatively small dimensions (e.g., 5 microns across), it may be desirable for the measurement of the distance between the first and second edges to be relatively precise (e.g., desired accuracy of 0.1 to 0.3 microns). By measuring the position of the first edge (e.g., as represented by the first feature FE1) and then utilizing the image correlation techniques to measure the relative position of the remote fiducial (e.g., the second feature FE2), the width of the object may be determined with a high degree of accuracy as being the difference between the distance $D_{FE}$ and the distance $D_K$.

Figure 5:
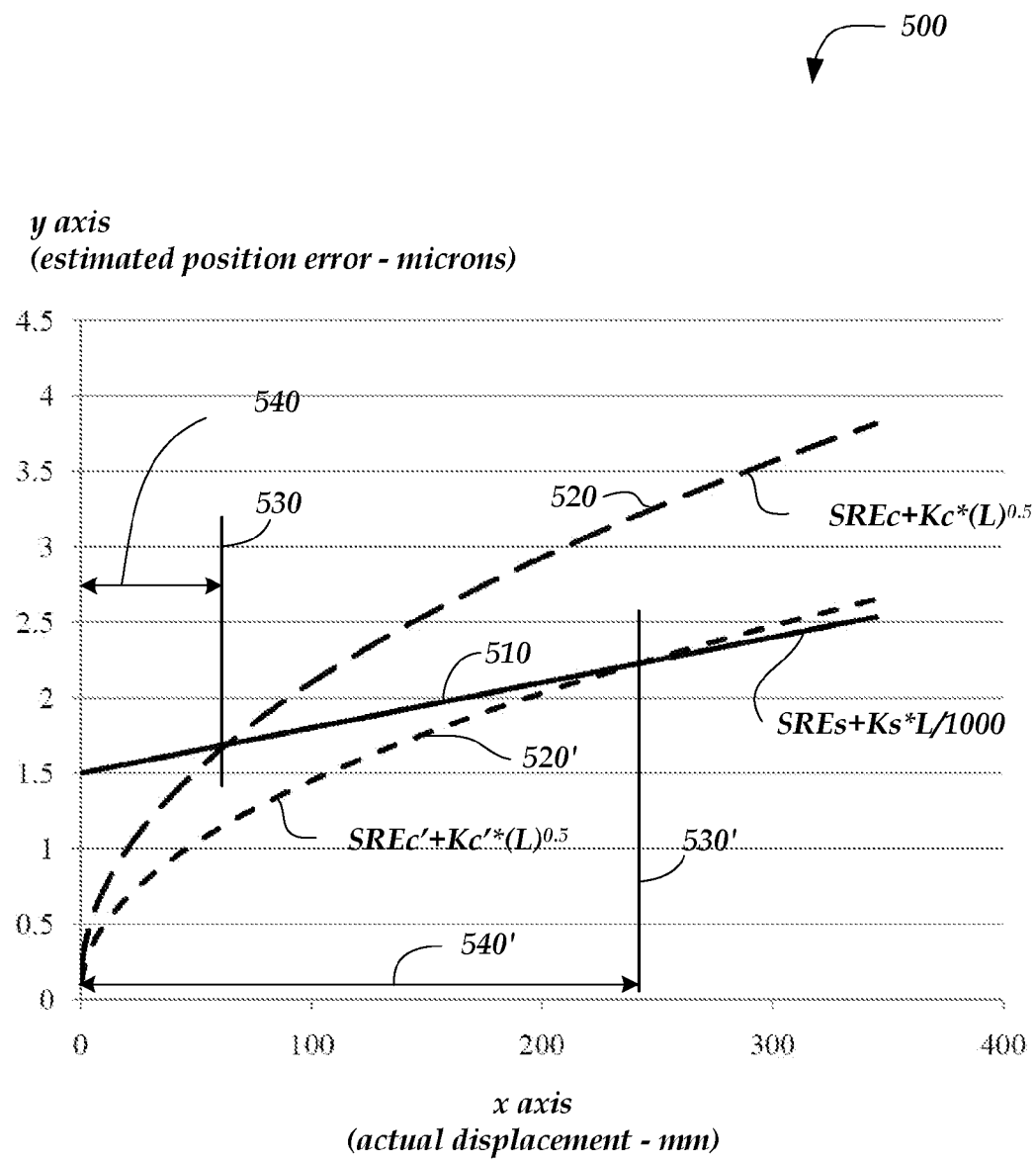
FIG. 5 is a graph illustrating error specifications for a first system utilizing a scale-based measurement portion and a second system utilizing image correlation for determining measurements.

FIG. 5 is a graph 500 illustrating exemplary error specifications for a machine vision system including a first displacement or position measuring system utilizing a scale-based measurement portion or the like in a first operating state, and including a second displacement or position measuring system utilizing image correlation for determining measurements as outlined above, in a second operating state. In the graph 500, estimated position error specifications (i.e., as referenced along the y-axis) are plotted versus actual position changes (i.e., as referenced along the x-axis). An error line 510 indicates an expected error range for the first system utilizing traditional scale-based measurement techniques. It will be understood that the error line 510 applies nominally to net displacement (e.g., absolute net displacement) along an axis. The error line 510 corresponds to an E1xy specified scale error of the form SREs+Ks*(L/1000). More specifically, this formula (which it will be appreciated is a significant simplification approximating a complex system) includes the short range scale error SREs (e.g., 1.5 microns in this example) plus the long range scale error coefficient Ks (e.g., 3 in this example) times the actual position change (L) expressed in millimeters divided by 1000. The E1xy specified scale error is applicable when the first and second features are located more than one field of view apart (i.e., if the first and second features are within the same field of view, then the E1xy specified scale error need not apply because the stage need not be moved to make a distance measurement within the field of view). With regard to the indicated short range error SREs (e.g., 1.5 microns), this error component may be due to various random and/or non-random errors in the scale or the associated signal processing circuits or routines, and the like (e.g., quadrature signal interpolation errors). It will be appreciated that this short range error component may be higher than is desired for certain applications and/or displacements (e.g., an application where the a distance being measured is between two features which do not appear in the same field of view, for example a feature separation on the order of 100 microns for some magnifications, and the desired accuracy is on the order of 0.1 to 0.3 microns). Even more advanced and expensive machine vision inspection systems with a specified scale error of 0.5+2 L/1000 microns may not be able to meet such desired levels of accuracy.

In contrast, as will be described in more detail below, the image correlation techniques of the present invention may provide higher measurement accuracy over short ranges. As shown in FIG. 5, an error line 520 indicates an expected error range for a second system utilizing the image correlation techniques of the present invention. It will be understood that the error line 510 applies nominally to an accumulated displacement (e.g., a displacement that totals all included displacement steps as absolute displacements, regardless of their direction) along an axis. In this specific example embodiment, the estimated correlation error indicated by the error line 520 is of the form SREc+Kc*(L)^0.5. More specifically, this approximating formula (which it will be appreciated is a simplification of a complex system) includes the short range correlation error SREc (e.g., 0.1 microns in this example) plus the long range correlation error coefficient Kc (e.g., 0.2 in this example) times the square root of the actual position change (L) expressed in millimeters, where the result is expressed in microns. The estimated correlation error is applicable when the first and second features are located more than one field of view apart (i.e., if the first and second features are within the same field of view, then the estimated correlation error need not apply because the stage need not be moved to make a distance measurement within the field of view).

In one specific example embodiment, this estimated correlation error may correspond to the following types of considerations, which may be supplemented by information gained from analysis or experiment. From statistical principles, random correlation errors may accumulate approximately in proportion to the square root of the number of correlations included in a displacement estimate, which accounts for the square root of the distance factor L appearing in the approximation of errors. For an approximation of accuracy, assuming 10 micron pixels on VGA (640×480) CCD, and 10× magnification, based on experimental results and/or analysis, an expected error based on image correlation may be on the order of SREc=100 nm of error per instance of image correlation (e.g., per image compared to the previous image), assuming a target with reasonable texture along the correlation image path. This accounts for the value of the short range correlation error SREc in this particular example. It may be desirable to limit the moves between correlation to something on the order of one half to one quarter of the field of view, to ensure a good amount of image area for correlation between images. With field of view size at 10× being approximately 0.64×0.48 mm for the CCD array outlined above, it may be desirable to limit the move between correlation images to approximately DM=0.25 mm. Using these values, we may approximate correlation errors as 0.1+0.1(L/M)^0.5, which may alternatively be expressed in terms of the formula outlined above with SREc=0.1 and Kc=(SREc/(DM^0.5))=(0.1/0.5)=0.2. The estimated error line 520 corresponds to these values. In various embodiments, increasing the magnification may decrease the short range error. It may also affect the long range error coefficient in that the error per correlation will become smaller and M (the desirable move between correlation images) will also become smaller. Of course, decreasing the magnification will have the opposite effect. For example, the estimated error line 520' corresponds to a higher magnification system, which is characterized by the values SREc'=0.05 and Kc'=0.14.

It will be appreciated that, as indicated by FIG. 5, for certain implementations the image correlation techniques of the present invention may provide for higher accuracy than the previously described scale-based measurement techniques for measurement, within a certain range wherein the estimated position error for the image correlation techniques (e.g., as indicated by the lines 520 and 520') is less than the estimated position error for the scale-based techniques (e.g., as indicated by the line 510). We may refer to this range as an enhanced position measurement limit or range 540 (for the estimated error line 520) or 540' (for the estimated error line 520'). As shown in FIG. 5, an enhanced position measurement limit line 530 illustrates a limit of the first desirable enhanced position measurement limit or range 540 which is indicative of a maximum recommended displacement limit for using the second operating state to provide an enhanced second state position measurement (e.g., a range where the image correlation technique may be preferred over the more traditional scale-based measurement technique, for a corresponding first optical system, due to its potential for providing lower errors). An enhanced position measurement limit line 530' illustrates a limit of the second desirable enhanced position measurement limit or range 540' in which the image correlation technique may be preferred over the more traditional scale-based measurement technique, for a corresponding second optical system. As previously outlined, the error line 510 and an enhanced position measurement limit or range apply based thereon, apply nominally to an accumulated displacement referenced to the location of a first correlation image (e.g., a displacement that totals all included displacement steps as absolute displacements, regardless of their direction) along an axis. However, in some embodiments, it may be quite unlikely that accumulated displacements will include a reversed direction, or significant deviations from a straight line, and an enhanced position measurement limit or range may be implemented as a simple distance limit relative to a first correlation limit in such embodiments.

In some embodiments, an enhanced position measurement limit or range may be indicated by an enhanced position measurement limit parameter included in a machine vision control system. The enhanced position measurement limit parameter is indicative of a maximum recommended displacement limit referenced to the first image, for using the second operating state to provide an enhanced second state position measurement. In one specific example implementation, the enhanced position measurement limit parameter corresponds to a maximum recommended displacement limit that is a specific number times a dimension of a field of view of the machine vision inspection system (e.g., 40 times a FOV dimension), since the image correlation technique has an error which depends partially on the accumulated number of images correlated. However, the enhancement range for any particular optical system may be expressed in absolute displacement terms, or any other convenient form, if desired.

As outlined above, while the scale-based measurement error estimate may be constant regardless of the magnification of an optical configuration, the image correlation measurement error estimate will generally depend on a particular optical configuration. Therefore, in general, the error relationships illustrated in FIG. 5, may be different for different optical configurations (e.g., different magnifications, or the like). It will be appreciated that the enhanced position measurement limit or range may be set more conservatively than the "equivalent error" limit or range shown in FIG. 5, such that an image correlation measurement is relatively certain to provide lower error than a scale-based measurement within that limit or range.

In various embodiments, error estimates and desirable enhanced position measurement limits or ranges, analogous to those illustrated in FIG. 5, may be determined for each desired optical configuration used in a machine vision system, either by experiment or analysis. It will be appreciated that a machine vision inspection system may comprise a plurality of enhanced position measurement limit parameters which correspond to a plurality of respective optical configurations of the machine vision inspection system. The desirable enhanced position measurement limits ranges, and/or related relationships to a present displacement or position, may be displayed or otherwise used to guide a user in choosing when to use the image correlation enhanced measurement techniques disclosed herein for an enhanced relative position measurement. For example, if a displacement or relative position falls within an enhanced position measurement range, determined as outlined above, and the scale-based error estimate is larger than a desired error limit, then the image correlation enhanced position measurement technique is preferred. Conversely, if the displacement or relative position falls outside an enhanced position measurement range determined as outlined above, then this may be indicated to the user, and/or the image correlation enhanced measurement techniques should not be used. Related user interface features and operations are outlined further below. Furthermore, if the scale-based error estimate is within a desired error limit, then the scale-based measurement may be preferred in some embodiments (even if it produces larger, but acceptable, errors), since it is a faster mode of position measurement.

Figure 6:
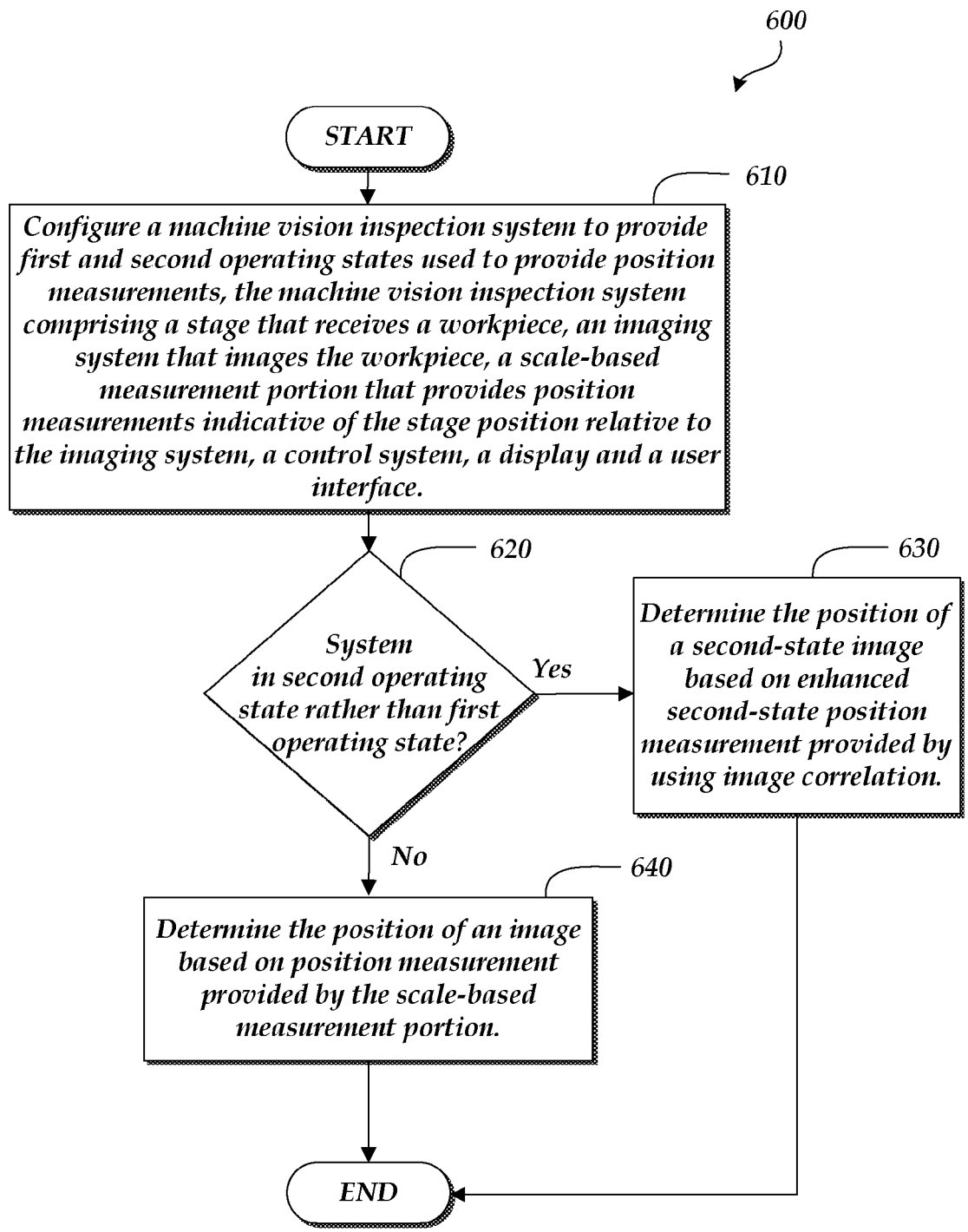
FIG. 6 is a flow diagram illustrating one embodiment of a general routine for operating a machine vision inspection system either in a first state using a scale-based measurement portion or a second-state using image correlation for determining measurements.

FIG. 6 is a flow diagram illustrating one embodiment of a general routine 600 for operating a machine vision inspection system in either a first state using a scale-based measurement portion or a second-state using image correlation for providing enhanced "second-state" position measurement. At a block 610, the machine vision inspection system is provided. The machine vision inspection system comprises a stage that receives a workpiece, an imaging system that images the workpiece, a scale-based measurement portion that provides position measurements indicative of the stage position relative to the imaging system, a control system, a display, and a user interface. The machine vision inspection system is configured to provide first and second operating states used to provide position measurements. The first operating state comprises providing the position of an image based on a scale-based position measurement provided by the scale-based measurement portion, and the second operating state comprises providing the position of at least one image based on using image correlation. In various embodiments, the user interface may be displayed on the display at least during a learn mode of operation of the machine vision inspection system, and the user interface comprises a second-state indicator that indicates when the second operating state is active. However, it will be appreciated that the user interface need not be displayed during the automatic run mode of operation of the system.

At a decision block 620, a determination is made as to whether the system is in the second operating state rather than the first operating state (e.g., a second operating state provided by an enhanced limited range position mode 143en of FIG. 2, employing principles outlined in relation to FIGS. 3, 4, and 5). In some embodiments, the system may be placed in the second operating state by the user operating a second-state activation element included in the user interface during learn mode operations. In some embodiments, the second operating state may be automatically implemented for certain tool conditions and/or measurement situations (e.g., when a small tolerance is set for distance measurements between closely spaced features). In some embodiments, the user may terminate such automatic implementations and place the machine in a first operating state by using a second state activation or deactivation element (e.g., an activation element may toggle between the first and second states). During run mode, the first and second operating states are governed by the part program (e.g., as recorded during the learn mode of operations and/or as hand-written by an expert user). In any case, if the system is in the second operating state, then the routine continues to a block 630, where the position of at least one second-state image is provided based on enhanced second-state position measurement provided by using image correlation. One embodiment of a more detailed implementation of this function at block 630 will be described in more detail below with respect to FIG. 7.

If at the decision block 620 it is determined that the system is in the first operating state rather than the second operating state, then the position of an image is determined based on a scale-based position measurement provided by the more standard scale-based measurement portion. As outlined above, in some embodiments, the machine vision inspection system may comprise an enhanced position measurement limit parameter which is indicative of a maximum recommended displacement limit referenced to a first image, for using the second operating state to provide an enhanced second state position measurement. If the location of the first image is defined, then in some embodiments the system may automatically revert to the first operating state for any image location outside the maximum recommended displacement limit.

Figure 7:
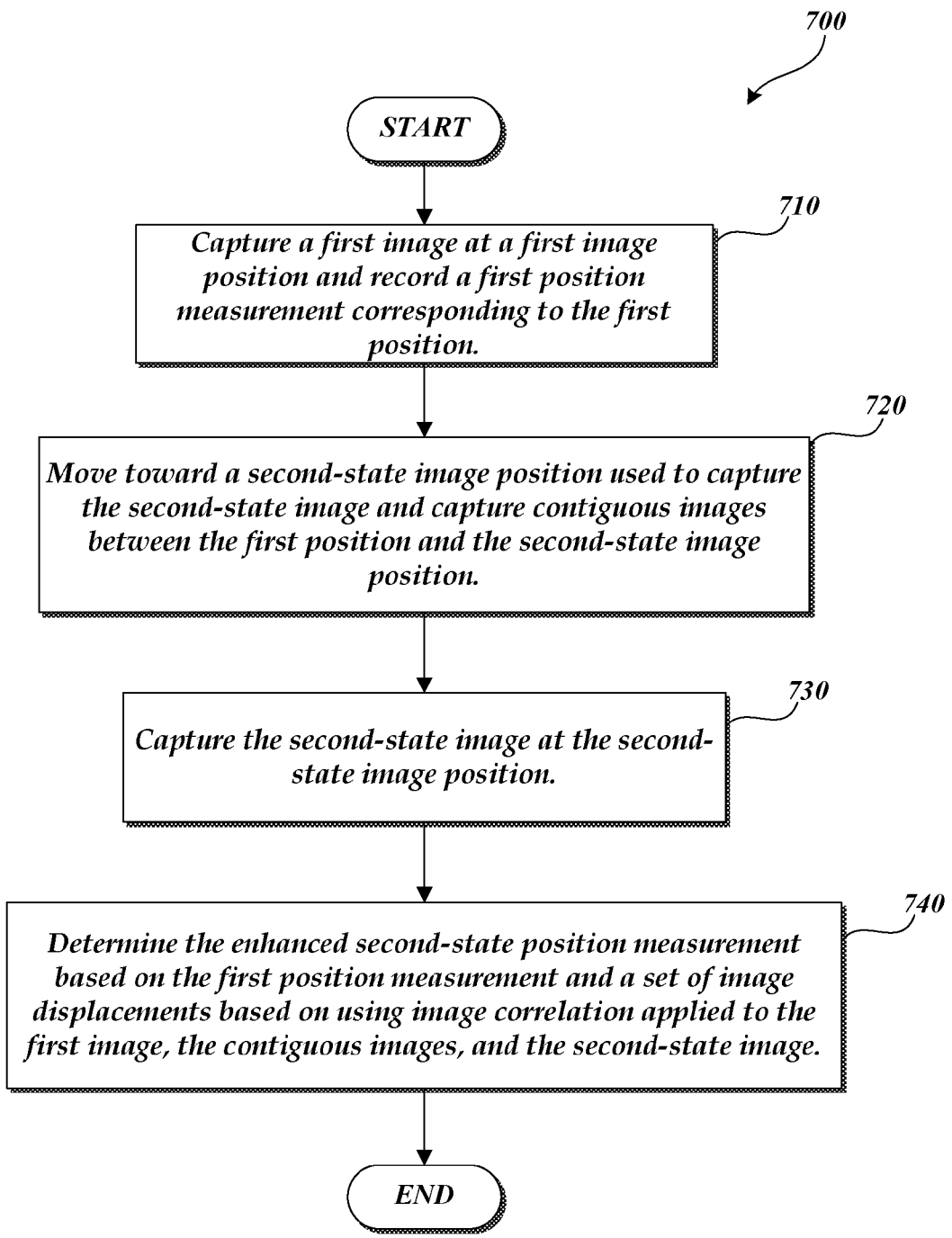
FIG. 7 is a flow diagram illustrating one embodiment of a routine for a more specific implementation of the second operating state of FIG. 6.

FIG. 7 is a flow diagram illustrating one embodiment of a routine 700 for a more specific implementation of the second operating state of block 630 of FIG. 6. The following description may also be understood with reference to FIG. 4. As shown in FIG. 7, at a block 710, a first image (e.g., image F1 of FIG. 4) is referenced, the first image position characterized by a first position measurement. In many instances, the first position measurement may be a scale-based position measurement (e.g., as determined in the first operating state). In some instances, the first position measurement may be an enhanced second-state position measurement determined during a period of operation of the second operating state. In some embodiments, the user interface comprises a second-state activation element (e.g., as illustrated in FIG. 8) operated by a user to start and/or reinitialize the second operating state, and the second operating state comprises the control system automatically defining the image position of a current image as the first image position when the second operating state is started or reinitialized.

At a block 720, the system is moved toward a second-state image position and overlapping images (e.g., overlapping images CIA, CIB, and CIC of FIG. 4) are captured between the first position and the second-state image position. In some instances, a motion control element of the system may be operated by a user during the learn mode of operation, to move from the first image position toward the second-state image position and define a nominal second-state image position (e.g., by stopping at that position). In some instances, the user may define intermediate positions that define the motion path between the first image position and the second-state image position (e.g., using a "Move To" command, or the like), in order to navigate around height changes or poor correlation image locations (e.g., large holes). In some embodiments, during the learn mode of operations, the second operating state comprises evaluating an image correlation quality metric for image correlations performed to determine a set of image displacements during the second operating state, and the user interface comprises an indicator of image correlation quality that is displayed based on the image correlation quality metric. In such embodiments, the user may navigate or edit the selection of intermediate positions based on the indicated image correlation quality. In some instances, the user may indicate a nominal second-state image position based on CAD data, and/or text entry, or the like. Movement to the nominal second-state image position may be based on using the scale-based measurement portion for motion control, while using image correlation to determine the measurement positions associated with the overlapping correlation images and the second-state image, as outlined above. In some embodiments, the control system may automatically determine the spacing between the overlapping images (e.g., one quarter or one half of a dimension of a field of view, or the like) along a motion path between the first image position and the second-state image position.

At a block 730, the second-state image (e.g., second-state image F2 of FIG. 4) is captured at the second-state image position. At a block 740, the enhanced second-state position measurement is provided based on the first position measurement and a set of image displacements determined based on using image correlation applied to the first image, the overlapping images, and the second-state image.

Figure 8:
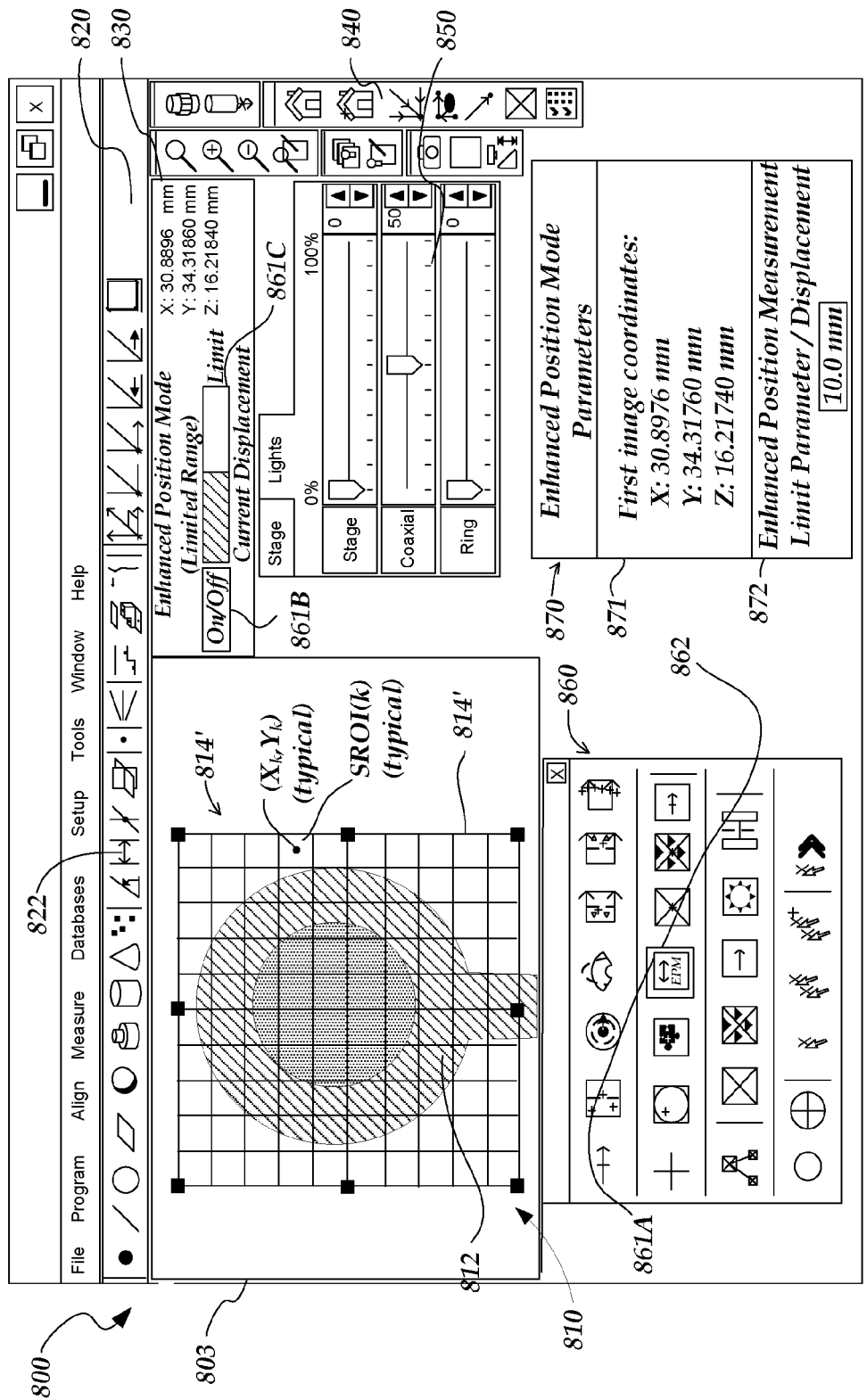
FIG. 8 is a diagram illustrating various features of one embodiment of a user interface display including a user selection for a second operating state using image correlation for determining measurements.

FIG. 8 is a diagram illustrating various features of one embodiment of a user interface display 800 including a user selection for a second operating state for an enhanced position mode using image correlation for position measurements. In the exemplary state shown in FIG. 8, the user interface display 800 includes a field of view window 803 that displays a workpiece image 810. The user interface display 800 also includes various measurements and/or operation selection bars such as the selection bars 820 and 840, a real-time X-Y-Z (position) coordinate window 830, and a light control window 850, and a tool/mode selection bar 860. In various embodiments, the user interface comprises an enhanced position measurement activation or deactivation element operated by a user to start and/or stop the operating state that provides the enhanced position measurement based on image correlation, such that during the learn mode of operation the user may control the machine vision system to operate in a first operating state that provides scale-based position measurements for images at a first time and in a second operating state that provides image correlation based position measurements for images at a second time. In one embodiment, the enhanced position measurement activation or deactivation element may be a button 861A located on the tool/mode selection bar 860, which may also indicate that the enhanced position measurement state is active by displaying an "active" box 862 at its periphery, when activated. In another embodiment, the enhanced position measurement activation element may be a button 861B, which is located in the coordinate window 830 in the embodiment shown in FIG. 8. In some embodiments, the user interface may include an enhanced position measurement displacement limit status indicator 861C which indicates at least one of a) a relationship between a current displacement referenced to a first image (e.g., the current image at the time the enhanced position measurement state was activated or reactivated, as previously outlined) and a maximum recommended displacement limit, and/or b) a warning when a current displacement referenced to the first image is greater than the maximum recommended displacement limit. In the embodiment shown in FIG. 8, the displacement limit status is indicated by the proportion of the status bar that is shaded. In an alternative embodiment, the status bar may be replaced with a simple warning, and an "OK" status may be understood unless the warning is displayed or highlighted. The enhanced position measurement displacement limit status indicator 861C may act as the activation element in some embodiments (e.g., wherein clicking on the status bar activates or deactivates the enhanced position measurement state). When the enhanced position measurement state is active, the displayed coordinates may be based on image-correlation-based position measurements. Any of the elements 861A-861C may indicate that the enhanced position measurement state is active by having a highlighted icon or text, when activated (or a greyed out icon or text when inactive), or the like.

In one embodiment, when the enhanced position measurement state is active, the user interface may automatically display an enhanced position measurement mode dialog box 870, for displaying and configuring the various parameters of the selected enhanced position mode. As shown in the enhanced position measurement mode parameter dialog box 870, a first image position box 871 may indicate the X-Y-Z coordinates of the first image that is referenced during the enhanced position measurement state. An enhanced position measurement limit parameter box 872 may display a value which is indicative of a maximum recommended displacement limit referenced to the first image, for using the enhanced position measurement operating state to provide an enhanced position measurement for a current optical configuration.

In various embodiments, the user interface may comprise an element operated by a user during the learn mode of operation (e.g., the distance measurement tool activated by distance tool button 822) to define a distance measurement between a first feature in the first image and a second feature in a second image acquired during the enhanced position measurement operating state. When the enhanced position measurement is used for the second image, the distance measurement comprises determining a difference between the first position measurement (regardless of whether it is a scale-based position measurement or an enhanced position measurement) and the enhanced position measurement of the second image, plus a difference of the respective feature positions relative to their respective images.

It will be appreciated that not all of the user interface elements outlined herein need to be used in all embodiments. Various features of the elements may be combined or omitted in various embodiments. Other alternative user interface embodiments will be apparent to one of ordinary skill in the art, based on the teachings of this disclosure.

As an example of the operation of the user interface display 800, in one specific example implementation, the user may initially capture a workpiece image 810 in the field of view window 803 and make a position measurement of a first feature in the image (e.g., using a known edge detection video tool). The user may then select an enhanced position mode button 861 to activate the enhanced position measurement operating state, at which point the system records the $XYZ_1$ coordinates of the first image (i.e., the stage position), such as may be displayed in the enhanced position mode parameter dialog box 870. The user then manually moves the stage in a direction toward a second image position, and during the movement overlapping images are captured according to previously outlined principles. Once the desired second image position is reached, the user stops moving the stage and captures the second image. The system records the $XYZ_2$ location of the second image as being the $XYZ_1$ coordinates of the first image plus the offset as determined by image correlation between the first image, the overlapping images, and the second image. In the second image, the user may make a position measurement of a second feature (e.g., using a known edge detection video tool). The user may also implement a distance measurement tool using the distance tool button 822, and determine the distance between the first and second feature, as outlined above. If the system is in a learn mode, the system records the relevant instructions, such as the sequence for capturing the first image, activating the enhanced position measurement operating state, recording the relative coordinates, capturing overlapping images during movement to the second image position, capturing the second image and recording the enhanced position measurement coordinates of the second image (e.g., relative to the coordinates of the first image), and any other parameters that are needed, and so on. The user may deactivate the enhanced position measurement operating state (thus returning to the default scale-based position measurement state) at any convenient time. During a run mode, the instructions recorded in the part program recreate the operations that were performed by the user during the learn mode, including the transitions to and from the enhanced position measurement operating state.

In some embodiments, when the enhanced position measurement operating state is active, an error checking process is performed which comprises comparing the position indicated by the enhanced position measurement based on image correlation to that indicated by the scale-based measurement portion. In one embodiment, if the difference between the distance indicated by the enhanced position measurement is different from that indicated by the scale-based measurement portion by an amount that is greater than an expected error range for the scale-based measurement portion (possibly including a defined safety margin), then a warning is provided to the user, and/or the condition is logged, and/or the measurement provided by the scale-based measurement portion is indicated as the current measurement. This reduces the risks of using the enhanced position measurement state.

While the preferred embodiment of the invention has been illustrated and described, numerous variations in the illustrated and described arrangements of features and sequences of operations will be apparent to one skilled in the art based on this disclosure. Thus, it will be appreciated that various changes can be made therein without departing from the spirit and scope of the invention.

The embodiments of the invention in which an exclusive property or privilege is claimed are defined as follows:

1. A precision machine vision inspection system comprising a stage that receives a workpiece, an imaging system that images the workpiece, a scale-based measurement portion that provides position measurements indicative of the stage position relative to the imaging system, a control system, a display, and a user interface, wherein:

the machine vision inspection system is configured to provide first and second operating states used to provide position measurements, wherein, the first operating state comprises determining the position of an image based on a scale-based position measurement provided by the scale-based measurement portion; and the second operating state comprises providing the position of at least one second-state image based on an enhanced second-state position measurement provided by using image correlation, the enhanced second-state position measurement comprising:

referencing a first image captured at a first image position, the first image position characterized by a first position measurement;

moving from the first image position toward a second-state image position used to capture the second-state image and capturing overlapping images between the first image position and the second-state image position;

capturing the second-state image at the second-state image position; and providing the enhanced second-state position measurement based on the first position measurement and a set of image displacements determined based on using image correlation applied to the first image, the overlapping images, and the second-state image;

the user interface is displayed on the display at least during a learn mode of operation of the machine vision inspection system, and the user interface comprises a second-state indicator that indicates when the second operating state that provides the enhanced second-state position measurement is active;

the machine vision inspection system comprises an enhanced position measurement limit parameter which is indicative of a maximum recommended displacement limit referenced to the first image, for using the second operating state to provide an enhanced second state position measurement; and the enhanced position measurement limit parameter corresponds to a maximum recommended displacement limit that is at most 40 times a dimension of a field of view of the machine vision inspection system.

2. The system of claim 1, wherein the user interface comprises a second-state activation element operated by a user to at least one of (a) start and (b) stop the second operating state that provides the enhanced second-state position measurement, such that the user may control the machine vision inspection system to operate in the first operating state at a first time during the learn mode of operation and in the second operating state at a second time during the learn mode of operation.

3. The system of claim 2, wherein the second-state activation element and the second-state indicator are provided by a single user interface element.

4. The system of claim 2, wherein the user interface comprises a second-state activation element operated by a user to start the second operating state, and the second operating state comprises the control system automatically defining the image position of a current image as the first image position when the second operating state is started.

5. The system of claim 1, wherein the machine vision inspection system further comprises a motion control element operated by a user to define the stage position relative to the imaging system during the learn mode of operation, and
   wherein moving from the first image position toward the second-state image position comprises:
      the user using the motion control element to define the nominal second-state image position; and
      the control system automatically determining the spacing between the overlapping images along a motion path between the first image position and the second-state image position.

6. The system of claim 5, wherein moving from the first image position toward the second-state image position further comprises:
   the user using the motion control element to define intermediate positions that define the motion path between the first image position and the second-state image position.

7. The system of claim 1, wherein the user interface comprises an enhanced position measurement displacement limit status indicator that indicates at least one of (a) a relationship between a current displacement referenced to the first image and the maximum recommended displacement limit, and (b) a warning when a current displacement referenced to the first image is greater than the maximum recommended displacement limit.

8. The system of claim 7, wherein the enhanced position measurement displacement limit status indicator and the second-state indicator are provided by a single user interface element.

9. The system of claim 1, wherein the machine vision inspection system comprises a plurality of enhanced position measurement limit parameters that correspond to a plurality of respective optical configurations of the machine vision inspection system.

10. The system of claim 1, wherein the user interface further comprises an element operated by a user during the learn mode of operation to define a distance measurement between a first feature in the first image and a second feature in the second-state image, wherein the distance measurement comprises a difference between the first position measurement and the second-state position measurement plus a difference of the respective feature positions relative to their respective images.

11. The system of claim 1, wherein during the learn mode of operation, the second operating state comprises evaluating an image correlation quality metric for image correlations performed to determine the set of image displacements during the second operating state, and wherein the user interface comprises an indicator of poor image correlation that is displayed based on the image correlation quality metric.

12. The system of claim 1, wherein the second operating state further comprises an error checking process that comprises comparing the enhanced second-state position measurement provided by the image correlation to the scale-based position measurement provided by the scale-based measurement portion.

13. The system of claim 12, wherein if a difference between the scale-based position measurement provided by the image correlation and the enhanced second-state position measurement provided by the scale-based measurement portion is greater than an expected error margin for the scale-based measurement portion plus a designated safety margin, then the system is configured to perform at least one of:
   providing a warning in the user interface that indicates that the scale-based position measurement provided by the image correlation may be inaccurate, or logging the condition, or providing the scale-based position measurement provided by the scale-based measurement portion as the current position measurement.

14. The system of claim 1, wherein the second operating state further comprises utilizing the scale-based measurement portion for indicating approximate scale-based image positions for at least one of (a) the overlapping images or (b) the second state image, such that a pixel offset search range for a correlation algorithm used in the second operating state is defined based on the approximate scale-based image positions.

15. A precision machine vision inspection system comprising a stage that receives a workpiece, an imaging system that images the workpiece, a scale-based measurement portion that provides position measurements indicative of the stage position relative to the imaging system, a control system, a display, and a user interface, wherein:
   the machine vision inspection system is configured to provide first and second operating states used to provide position measurements, wherein,
      the first operating state comprises determining the position of an image based on a scale-based position measurement provided by the scale-based measurement portion; and
      the second operating state comprises providing the position of at least one second-state image based on an enhanced second-state position measurement provided by using image correlation, the enhanced second-state position measurement comprising:
         referencing a first image captured at a first image position, the first image position characterized by a first position measurement;
         moving from the first image position toward a second-state image position used to capture the second-state image and capturing overlapping images between the first image position and the second-state image position;
         capturing the second-state image at the second-state image position; and
         providing the enhanced second-state position measurement based on the first position measurement and a set of image displacements determined based on using image correlation applied to the first image, the overlapping images, and the second-state image;
   the machine vision inspection system further comprises an enhanced position measurement limit parameter that is indicative of a maximum recommended displacement limit referenced to the first image, for using the second operating state to provide an enhanced second-state position measurement; and
   the enhanced position measurement limit parameter corresponds to a maximum recommended displacement limit that is at most 40 times a dimension of a field of view of the machine vision inspection system.

16. The system of claim 15, wherein the user interface comprises an enhanced position measurement displacement limit status indicator that indicates at least one of (a) a relationship between a current displacement referenced to the first image and the maximum recommended displacement limit, and (b) a warning when a current displacement referenced to the first image is greater than the maximum recommended displacement limit.

17. The system of claim 16, wherein the enhanced position measurement displacement limit status indicator and the second-state indicator are provided by a single user interface element.

18. The system of claim 15, wherein the machine vision inspection system comprises a plurality of enhanced position measurement limit parameters that correspond to a plurality of respective optical configurations of the machine vision inspection system.

19. A precision machine vision inspection system comprising a stage that receives a workpiece, an imaging system that images the workpiece, a scale-based measurement portion that provides position measurements indicative of the stage position relative to the imaging system, a control system, a display, and a user interface, wherein:

the machine vision inspection system is configured to provide first and second operating states used to provide position measurements, wherein, the first operating state comprises determining the position of an image based on a scale-based position measurement provided by the scale-based measurement portion; and the second operating state comprises providing the position of at least one second state image based on an enhanced second-state position measurement provided by using image correlation, the enhanced second-state position measurement comprising:

referencing a first image captured at a first image position, the first image position characterized by a first position measurement;

moving from the first image position toward a second-state image position used to capture the second-state image and capturing overlapping images between the first image position and the second-state image position;

capturing the second-state image at the second-state image position; and providing the enhanced second-state position measurement based on the first position measurement and a set of image displacements determined based on using image correlation applied to the first image, the overlapping images, and the second-state image;

the user interface is displayed on the display at least during a learn mode of operation of the machine vision inspection system, and the user interface comprises a second-state indicator that indicates when the second operating state that provides the enhanced second-state position measurement is active;

the second operating state further comprises an error checking process that comprises comparing the position measurement provided by the image correlation to that indicated by the scale-based measurement portion; and if a difference between the distance indicated by the image correlation and that indicated by the scale-based measurement portion is greater than an expected error margin for the scale-based measurement portion plus a designated safety margin, then the system is configured to perform at least one of:

providing a warning in the user interface that indicates that the scale-based position measurement provided by the image correlation may be inaccurate, logging the condition, and providing the position measurement provided by the scale-based measurement portion as the current position measurement.

* * * * *